May 8, 1962  R. K. DICKASON  3,033,021
PLASTOMETER
Filed Dec. 30, 1959  2 Sheets-Sheet 2
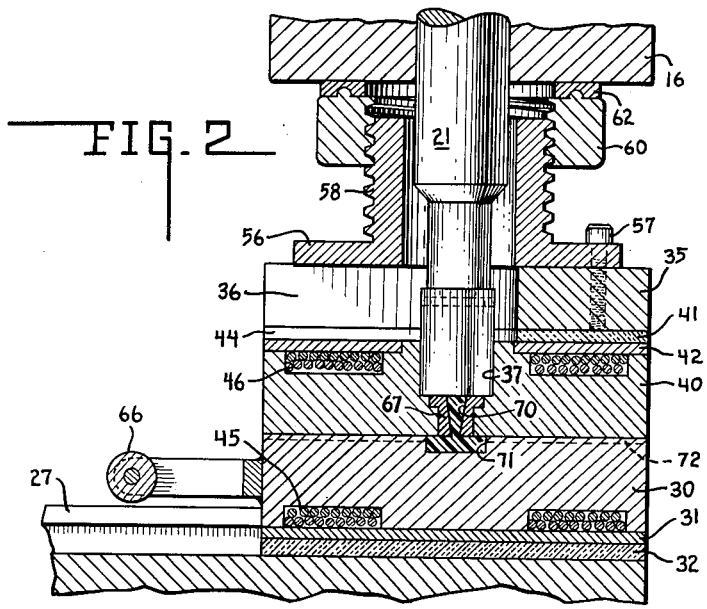
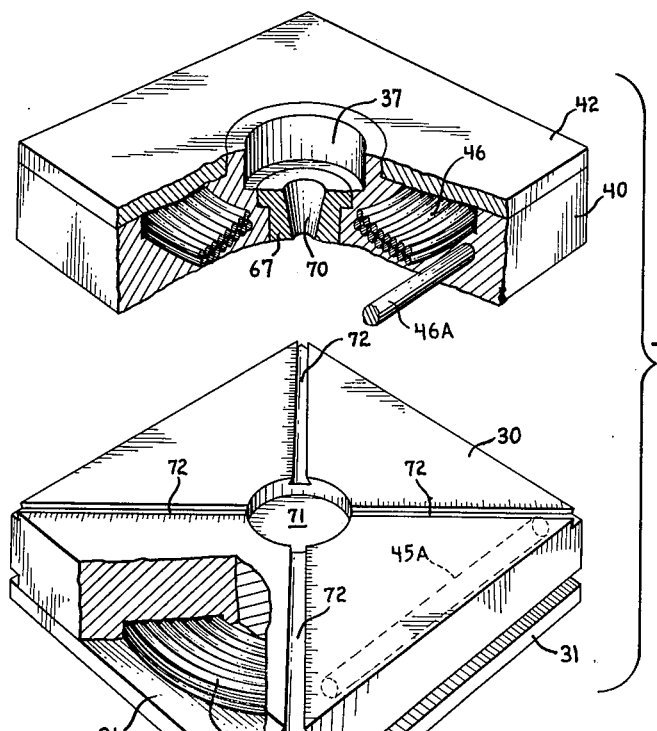
INVENTOR.
R. KEITH DICKASON
BY
Lockwood, Woodard, Smith & Weikart
ATTORNEYS United States Patent Office 3,033,021
Patented May 8, 1962

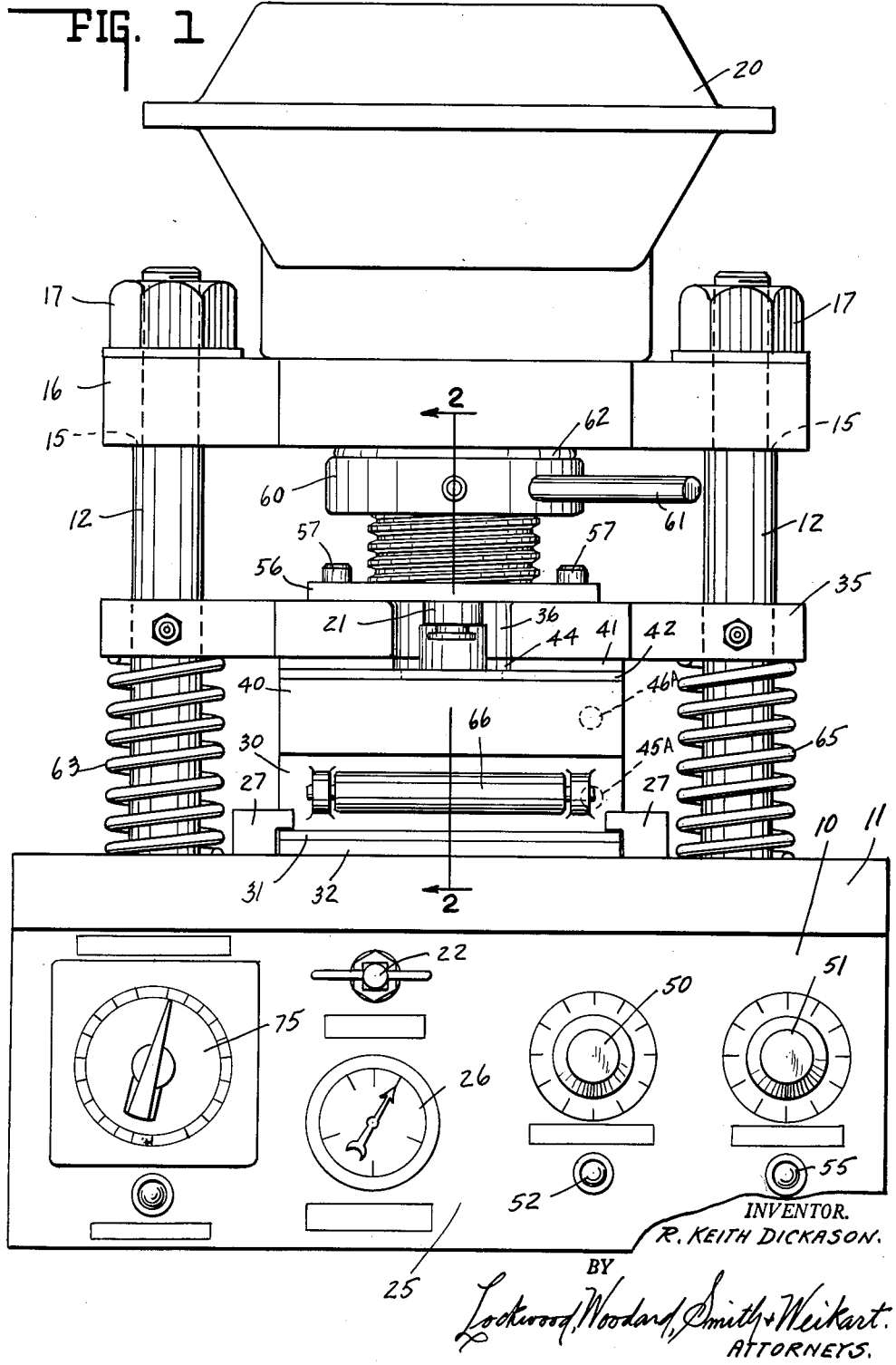

3,033,021
PLASTOMETER
Ronald Keith Dickason, 505 Redbud Lane, Xenia, Ohio
Filed Dec. 30, 1959, Ser. No. 862,845
4 Claims. (Cl. 73—15.6)

This invention relates to a testing machine and more particularly to a plastometer for testing rubber and similar materials and for measuring plasticity and flow characteristics of such materials.

One method known in the art for testing rubber like materials involves the use of a pair of pallets between which there is inserted a pellet of material to be tested which has precise dimensions and temperature. The platens are moved together by a predetermined force for a predetermined period of time and the resulting permanent compression of the material is used as a measure of the plasticity thereof. It is necessary that such a method be conducted by persons having a high degree of skill. Also, it is frequently the case that the results of the method cannot be accurately determined and do not give a truly useful measure of the plasticity of the material.

Also in present day manufacturing operations, rubber and similar materials are frequently formed in molds having relatively long tortuous paths through which the material must flow. The above mentioned method of testing plasticity does not always give a true indication of the ability of such material to flow through such paths and to fill such a mold.

It is an object of the present invention to provide a new and improved plastometer.

A further object of the invention is to provide a plastometer which can be operated by a relatively unskilled, inexperienced person and which will give results which can be easily, quickly and accurately read.

Still another object of the invention is to provide a plastometer which gives a better indication of the flow characteristics of a material and a better indication of the ability of a material to flow through narrow paths than do presently known plastometers.

In accordance with the invention, there is provided an apparatus for measuring the flow characteristics of a material which includes a mold element having a pair of cavities. A passage leads between the cavities and a plurality of troughs extend radially outwardly from one of the cavities. There is provided means for forcing material received within the other of the cavities through the passage and into the one cavity and troughs. The flow characteristics of the material are measured by the distance of flow of the material in the troughs.

One feature of the invention is that as a result of the operation of the apparatus, there is formed a disc of rubber or other material being tested which may be used for obtaining the shrinkage factor and the durometer of the material being tested.

The full nature of the invention will be understood from the accompanying drawing and the following description and claims.

FIG. 1 is a front elevation of a plastometer embodying the present invention.

FIG. 2 is a section taken along the line 2—2 of FIG. 1 and in the direction of the arrows.

FIG. 3 is an exploded perspective view of certain portions of the plastometer.

Referring now to the drawing, this invention comprises a frame 10 having mounted thereon a base plate or lower platen 11. Secured to the base plate 11 and extending upwardly therefrom is a pair of stanchions or upright members 12—12 each of which has an annular shoulder 15 upon which rests an upper platen or pressure plate 16. The pressure plate 16 is fixed to the stanchions 12 by means of nuts 17—17.

A conventional diaphragm type air cylinder 20 is mounted upon the pressure plate 16 and has a piston 21 operatively associated therewith. The piston 21 extends downwardly through the pressure plate and may be caused to exert a downward pressure by operation of an air pressure regulator 22 mounted upon a control panel 25 fixed to the frame 10. The amount of pressure exerted by the piston 21 may be read from an air pressure gauge 26 on the control panel and may be set at any desired value by means of the regulator 22. Suitable air pressure conduits (not shown) are provided for conducting air pressure from a suitable source through the regulator 22 to the air cylinder 20.

A pair of tracks 27—27 extend from front to rear of the base plate 11, are fixed thereto and provide a guide for a lower mold plate 30 which is slidable forwardly and rearwardly of the base plate 11. The mold plate 30 has a plate 31 fixed to the bottom thereof for retaining the mold plate between the tracks 27, the plate 31 being slidable upon a slab of insulating material 32 fixed to the base plate 11.

Reciprocally mounted upon the upright members 12 is a pressure plate or yoke 35 having a central indentation or recess 36 which provides access to a cylindrical cavity 37 opening onto the upper face of an upper mold plate 40. The upper mold plate 40 and the pressure plate 35 are fixed together and have sandwiched therebetween a slab of insulating material 41 and a metal plate 42, the insulating material 41 having an indentation 44 similar in size to the indentation 36 of the pressure plate 35.

Heater coils 45 and 46 are mounted within respective mold plates 30 and 40 and may be controlled to set the respective mold plates to desired temperatures by means of control knobs 50 and 51 mounted upon the control panel. Thermostate probes 45A and 46A are associated with the respective control knobs and are arranged in conventional manner to maintain the particular temperature settings of the control knobs. The heater elements 45 and 46, thermostat probes 45A and 46A and control knobs 50 and 51 have associated therewith suitable wiring and rheostats for supplying and controlling heating currents of electricity to the heating elements 45 and 46. Since this wiring is conventional, it has not been shown. Indicator lights 52 and 55 are associated with each of the control knobs for notifying the operator when the respective mold plates have reached desired temperatures.

A member 56 is mounted by means of cap screws 57 upon the upper surface of the pressure plate 35 and has a hollow threaded portion 58 extending upwardly therefrom, the piston 21 being reciprocal within the member 56. An internally threaded adjusting nut 60 is threadedly received upon the member 56 and may be rotated by means of a handle 61 so as to cause the nut to bear against a bearing plate 62 suitably mounted between the nut and the pressure plate 16. When the nut is rotated against the bearing plate 62, the yoke 35 will be forced downwardly causing the upper mold plate 40 to be pressed and held against the lower mold plate 30.

A pair of coiled compression springs 63 and 65 are received upon the stanchions 12 for biasing the upper mold plate 40 upwardly away from the lower mold plate 30. When the adjusting nut 60 is rotated downwardly from the position illustrated in FIG. 1, the springs 63 and 65 will hold the mold plate 40 upwardly so that the lower mold plate 30 may be moved forwardly or leftwardly as viewed in FIG. 2 from beneath the upper mold plate 40. A suitable handle 66 is mounted upon the lower mold plate for this purpose. An insert 67 is fixedly mounted within the upper mold plate 40 and forms a part thereof. A passage 70 extends through the insert 67 from the base of the cavity 37 to the lower surface of the upper mold plate 40, the passage tapering from a reduced diameter with respect to the diameter of the cylindrical cavity 37 to an even smaller diameter at its lower end.

Referring to FIG. 3, the lower mold plate 30 is formed with a cylindrical cavity 71 at its center and opening on the upper face of the mold plate 30. Extending radially outwardly from the cavity 71 to the four corners of the lower mold plate are a plurality of troughs 72—72. The lower mold plate has graduations on its upper surface adjacent each of the troughs and also has suitable indicia inscribed thereon for indicating distance from the cavity 71.

In order to test a sample of material such as rubber, the operator sets the pressure regulator 22 to a predetermined pressure. The sample of material is moved through the indentations 44 and 36 into the cavity 37. The knobs 50 and 51 are operated to bring the two mold plates to desired temperatures for the test. If the mold plate 30 is not in the position illustrated in FIGS. 1 and 2, it is moved by the handle 66 to the illustrated position so that the cylindrical cavity 71 is positioned in coaxial registry with the passage 70 in the upper mold plate 40. The adjusting nut 60 is rotated upwardly so as to bear against the bearing plate 62 and to cause the upper mold plate to be pressed and held in tight contact with the lower mold plate.

The timer 75 is set to a desired test time. The timer has associated therewith a solenoid value (not shown) which controls the flow of air to the air cylinder 20. The setting of the timer to a desired time causes piston 21 to automatically move downwardly into the cavity 37 and to exert a desired amount of pressure upon the material being tested. The piston forces the material through the passage 70 and into the cylindrical cavity 71 and troughs 72 at a speed varying with the material being tested. The distance that the material will flow down the troughs 72 will depend upon the plasticity of the material and the cure characteristics thereof. When the desired time of testing has elapsed, the piston 21 moves upwardly automatically out of the cavity 37 as a result of the operation of the above mentioned solenoid value. The adjusting nut 60 is rotated downwardly so as to allow the springs 62 and 65 to move the upper mold plate 40 away from the lower mold plate 30.

Because of the small size of the passage 70 at its lower end, the material will break at that point so as to allow the lower mold plate 30 to be slid leftwardly as viewed in FIG. 2 for observation of the upper surface of the lower mold plate. Because of the fact that the troughs 72 have graduations adjacent thereto, the distance of flow of material within the troughs may be easily read. The average of the readings taken from the four troughs will determine a flow index number for the material.

It should be noted that each of the troughs has its largest dimension at its lower inward surface and tapers upwardly to a smaller dimension at the upper surface of the mold plate. This structure causes the material in the trough to be broken cleanly away from the upper mold plate when it is raised away from the lower mold plate. It should also be noted that the material within the cylindrical cavity 71 will be formed into a disc providing a suitable sample for obtaining the shrinkage factor and the durometer of the material being tested.

The present device may be modified so that it will provide a graphic performance curve inscribed on a card or paper. For example, commercially available recording devices could be mechanically hooked up to the piston 21 for indicating the movement of the piston with respect to time. It should be understood, however, that such a modification will provide merely supplementary information to the information gained by reading the flow characteristics of the material from the distance of flow in the graduated troughs. Therefore, such a modification is not at all necessary to the function of the present apparatus.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for measuring flow characteristics of a material which comprises a mold element, said mold element having a pair of cavities, a passage leading between said cavities, and a plurality of elongated passageways extending radially outwardly from one of said cavities, means for forcing material received within the other of said cavities through said passage into said one cavity and passageways, the flow characteristics of said material being measured by the distance of flow of the material in said passageways.

2. Apparatus for measuring flow characteristics of a material which comprises a mold element; said mold element having a first cylindrical cavity and a second cylindrical cavity, a passage leading between said cavities, and a plurality of elongated passageways extending radially outwardly from said second cavity, a piston reciprocable within said first cavity, means for moving said piston through said first cavity to force material in said first cavity through said passage into said second cavity and passageways, the flow characteristics of said material being measured by the distance of flow of the material in said passageways.

3. Apparatus for measuring flow characteristics of a material which comprises a pair of mold plates, means within said mold plates for heating said plates to a desired temperature, one of said plates having a cylindrical cavity therein opening on an upper face of said one plate and a passage extending from the base of said cavity to the lower face of said one plate, said passage having a reduced cross section with respect to said cavity, the other of said plates having a cylindrical cavity opening on an upper face thereof and a plurality of narrow elongated upwardly opening troughs extending radially outwardly of said cylindrical cavity, means for forcing said plates together with said passage and the cavity of said second plate in coaxial registry, the lower face of said one mold plate and the upper face of said other mold plate having complementary shapes such that the forcing together of said plates closes off the upwardly opening portion of said troughs, a piston, means for forcing said piston into said first mentioned cavity to force material in said first mentioned cavity through said passage into the cavity and troughs of said other plate, said other plate being graduated adjacent each of said troughs for indicating the distance of flow of the material in said troughs.

4. Apparatus for measuring flow characteristics of a material which comprises an upper mold plate, a lower mold plate, means for biasing said upper mold plate upwardly away from said lower mold plate, said lower mold plate being horizontally slidable between a position beneath said upper mold plate and a position out from under said upper mold plate, a handle secured to said lower mold plate for the sliding thereof between said positions, means for heating each mold plate to a desired temperature, said upper mold plate having a cylindrical cavity therein opening on an upper face of said upper mold plate and a passage extending from the base of said cavity to the lower face of said upper mold plate, said passage having a reduced cross section with respect to said cavity, said lower mold plate having a cylindrical cavity opening on an upper face thereof and a plurality of narrow elongated troughs extending radially outwardly of said cylindrical cavity and also opening on the upper face of said lower mold plate, means for pressing and tightly holding said mold plates together with said passage and the cavity of said lower plate in coaxial registry, the lower face of said upper mold plate and the upper face of said lower mold plate having complementary shapes such that the holding together of said mold plates closes off the upwardly opening portion of said troughs, a piston, means for forcing said piston downwardly into said cavity of said upper plate to force material in said first mentioned cavity through said passage into the cavity and troughs of said lower plate, said lower plate being graduated adjacent each of said troughs for indicating the distance of flow of the material in said troughs.

References Cited in the file of this patent

UNITED STATES PATENTS

| | | |
|---|---|---|
| 2,112,190 | Dillon et al. | Mar. 22, 1938 |
| 2,523,471 | Lally | Sept. 26, 1950 |
| 2,595,293 | Reece | May 6, 1952 |